Patented July 20, 1937

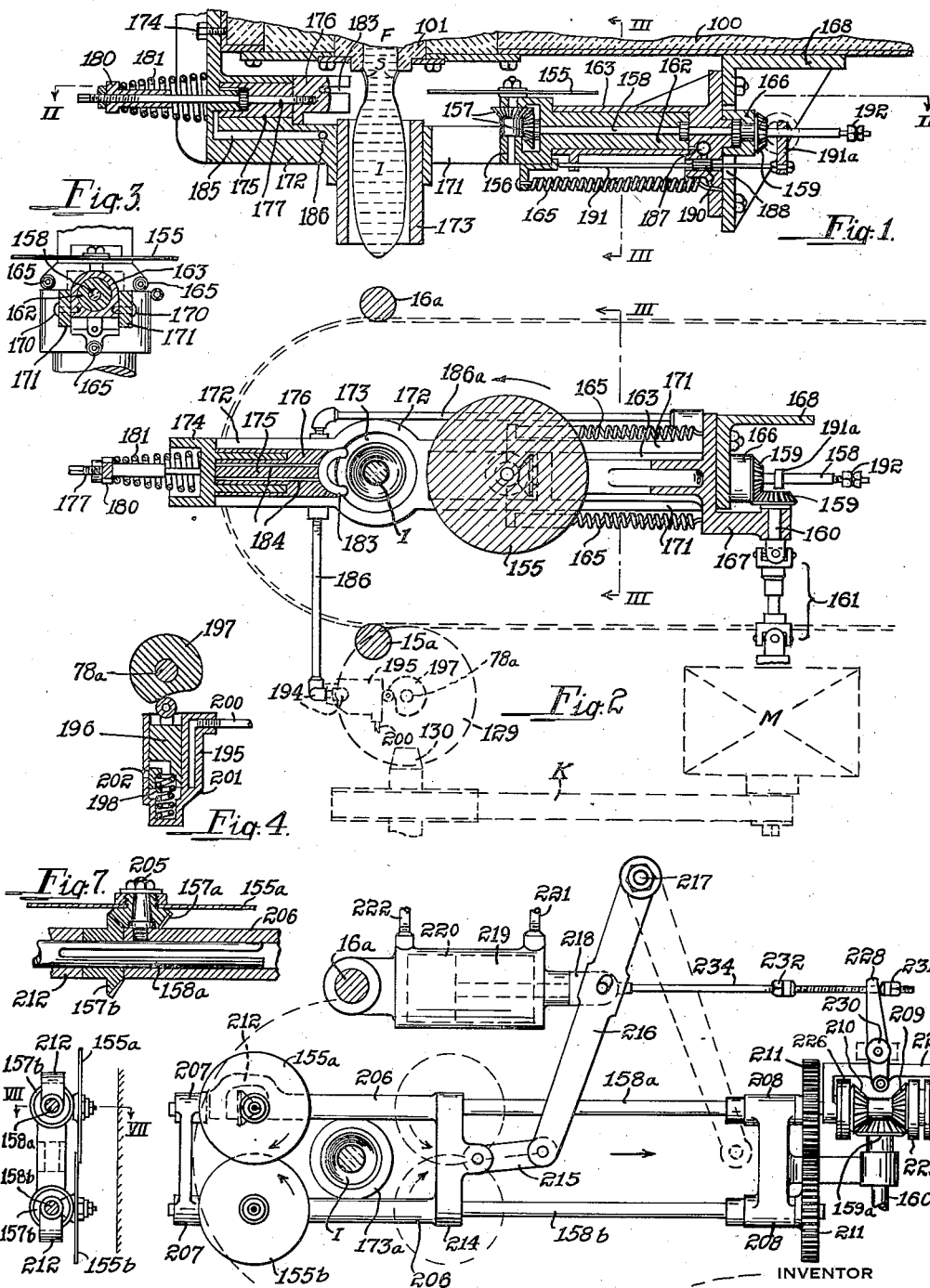

2,087,459

UNITED STATES PATENT OFFICE 2,087,459

SEVERING MECHANISM AND METHOD OF FORMING MOLD CHARGES

Frank L. O. Wadsworth, Pittsburgh, Pa., assignor to Ball Brothers Company, Muncie, Ind., a corporation of Indiana Original application July 11, 1933, Serial No. 679,888. Divided and this application March 31, 1934, Serial No. 718,359. Renewed March 2, 1936

22 Claims. (Cl. 49—14)

This invention relates to a severing mechanism for dividing a continuously flowing stream of plastic material into individual and successive units and more particularly, to an improved severing mechanism for cutting a stream of molten glass having regularly recurrent enlarged sections, at its points of reduced diameters into successive mold charges, and is a division of my copending application Serial No. 679,888, filed July 11, 1933.

One of the principal objects of this invention is to provide a novel apparatus for cutting such a stream of molten glass close to the orifice through which the glass is being delivered without chilling or marking the molten material at the plane of severance.

Another object of this invention is to provide a severing mechanism for cutting a stream of molten glass which will mechanically generate heat and in effect, melt off the successive mold charges, thereby eliminating the possibility of scarring the severed charge or the remaining stub.

A further object of this invention is to provide a shear mechanism for severing a stream of molten glass which exerts very little lateral pressure on the material during the cutting action and will not pinch or squeeze the material during such cutting action and which serves to heat rather than chill the glass at the plane of severance, thereby avoiding the shear marks which are frequently produced by the use of the ordinarily reciprocating shear blades.

A still further object is to provide a severing mechanism in which the severance is accomplished by moving into the path of travel of the stream a revolving disc which is rotating at such a high speed that when in contact with the stream, it acts similar to a saw and does not pinch and distort the severed charge or the end of the remaining stub.

These and other objects which will be made apparent to those skilled in this particular art are accomplished by means of my invention, certain embodiments of which are described in the following specification and illustrated in the accompanying drawing, in which:

Figure 1 is a view in longitudinal section taken through the flow orifice of a forehearth and illustrates the position of my improved shear mechanism relative to the bottom of the forehearth;

Fig. 2 is a section taken on line II—II of Fig. 1;

Fig. 3 is a section taken on line III—III of Fig. 2;

Fig. 4 is a sectional view illustrating the timer valve for operating the shear mechanism;

Fig. 5 is a partial plan view of another modification of my improved severing mechanism;

Fig. 6 is a partial end view of the mechanism illustrated in Fig. 5, and

Fig. 7 is an enlarged vertical section on the plane VII—VII of Fig. 6.

Generally speaking, my improved severing mechanism consists of either a single or a double disc, mounted in close proximity to the lower end of the delivery orifice and rotated at a high peripheral speed which is movable across the stream at substantially right angles thereto to effect the severance, and when in contact with the stream, a sufficient amount of heat is generated thereby to actually melt away the stream in advance of the revolving disc or discs. This shear therefore, serves to heat rather than chill the glass at the plane of severance and avoids the smear and shear marks which are frequently produced by the use of ordinary reciprocating shear blades which sever the material by a combined pinching and squeezing action.

Referring to the drawing in detail, I have illustrated my improved shear mechanism in connection with a forehearth 100 of the usual type and construction, which has a delivery ring 101 mounted in the bottom thereof which defines the delivery orifice F through which a plastic material such as glass is issuing in a continuously flowing pulsating stream, having regularly recurrent enlarged sections connected together by points of reduced diameters, which is adapted to be severed at the points of reduced area into individual mold charges. Any suitable type of forced flow feeder (none shown), such as the ordinary "sticky plunger" and air feeders may be employed for feeding the molten material through the orifice F.

In Figs. 1 to 4, inclusive, I have illustrated one embodiment of my improved severing mechanism in which a thin metal disc 155 is employed for severing the stream. This metal disc which is constantly revolved at a high peripheral speed, e. g. 3000 to 4000 feet per minute, is mounted on a mandrel 156 which is driven from a suitable motor M through a train of shaft and gear elements 157—157—158—159—159—160, the last of which is connected to the motor M by a flexible double universal joint or coupling member 161. The disc mandrel 156, the miter gears 157—157, and the intermediate shaft 158 are all supported by an elongated piston member 162 which is reciprocably mounted in a cylinder 163 and is normally held in its retracted position therein by tension springs 165. The miter gears 159—159 and the shaft 160 are supported in bearing members 166—167 that are carried by the rear head of the cylinder 163 and these elements of the driving train are operatively connected to the piston supported elements 156—157—158 by a keyway and spline connection between the shaft 158 and the gear 159 that is slidably mounted thereon.

The cylinder 163 and the parts associated therewith are all supported on an angle bracket 168 which is bolted against the metal floor plate of the forehearth 100 and is also preferably secured as by the bolts 170 (Fig. 3) to the forwardly extending side bars 171—171 which form a guide for the head of the reciprocating piston 162 and prevent the latter from turning in its cylinder support. These side bars 171—171 are connected to form a head member 172 that is adapted to carry a removable guard tube 173 which is positioned below and in axial alignment with the delivery orifice F in the forehearth.

The head 172 is also provided with an upwardly turned bracket extension 174 that is bolted to the front wall of the forehearth framework and thus serves to assist in holding the associated cylinder piston and guard tube assembly 163—162—173, etc. in proper relationship to the downwardly flowing glass stream. The head 172 is also bored out to form a cylinder therein for receiving a second piston element 175 which is provided with a head 176 that is detachably secured thereto by means of a threaded piston rod 177.

The rod 177 extends through the front wall of the piston chamber and is engaged by a threaded sleeve 180 which serves to limit the inward movement of the piston members 175—176 and also serves to receive the thrust of the return spring 181 which is mounted around the rod 177 and normally holds the said members in their outer retracted position.

The head 176 is provided with a flared semicylindrical recess, which is shaped to conform to the contour of the adjacent portion of the outflowing stream of glass at the moment when said stream is contracting or necking as a result of the termination of the forced flow through the orifice F and just before any retractive force is exerted on the glass by the upward movement of the plunger in the plunger type of feeder or the application of vacuum in the ordinary air feeders. This head 176 is also provided with a narrow slot 183 which is preferably connected to the chamber in front of the piston 175 by restricted ducts 184—184 (Fig. 2) through which a suitable high pressure fluid such as steam is directed against the stream of glass during the severing operation.

The chamber in front of the piston 175 is connected to a suitable reservoir of high pressure fluid (such as compressed air or preferably superheated steam) by a passageway 185 in the head 172 and a pipe connection 186 which is in communication through a pipe 186a with a passage 187 that leads to the rear of the piston member 162. The passage 187 is also provided with an atmospheric vent port 188 which is controlled by a piston valve 190 which is actuated by a tappet valve rod 191. The valve 190 is opened and closed at the ends of the forward and rearward movements of the piston member 162 by the respective engagement of an arm 191a on the tappet rod 191 with an adjustable collar 192 on the shaft 158 and of the end of the tappet rod 191 with the head of the piston 162.

The pipe 186 is connected by a vertical pipe 194 with a valve box 195 (Figs. 2 and 4) which contains a piston valve 196 that is moved in one direction by a cam 197 on a cam shaft 78a and in the opposite direction when released by the cam 197 by a return coil spring 198. The cam shaft 78a also contains the cams for controlling the operation of the feeder mechanism and is continuously driven through a suitable gear and pinion 129—130, the shaft 131 supporting the pinion gear 130 being preferably driven from the motor M by means of sprocket or belt connection K indicated in dotted lines in Fig. 2. The valve box 195 is connected to a fluid supply conduit 200 by a passage 201 and when the piston is held in its outermost position by the raised portion of the cam 197, the passage 201 is closed and the pipe connections 186—194 are opened to an atmospheric exhaust port 202 and the pistons 162—175 of the shear mechanism are held in their retracted positions by the springs 165—181.

The operation of the last-described mechanism is as follows: The cam 197 is preferably set so that it opens the passageway 201 and admits pressure fluid to the shear cylinders 163—172 at the instant that a cam (not shown) on the shaft 78a starts to move the plunger upwardly or applies vacuum to the glass in the air bell. The delivery of pressure fluid to the shear cylinders moves the pistons 175 and 162 forward so as to bring the slotted head 176 in juxtaposition to the necked in portion of the stream and to then pass the revolving disc 155 through this reduced and substantially stationary section of the molten glass.

The slotted block 176 is not designed or intended to take any part in the actual severance of the stream, but acts only as a guard which will prevent, to some extent, the radial projection of minute particles of glass from the edge of the rapidly revolving disc and which may also be used to assist in encompassing the stream in a protective envelope of highly heated gas that is supplied to the slot 183 through the restricted duct opening 184—184.

Figs. 5, 6, and 7 illustrate (somewhat diagrammatically) an alternative form of "double disc" shear which may be used in place of the one shown in Figs. 1, 2, 3, and 4. This second exemplification of my revolving disc cutter comprises a pair of overlapping discs 155a—155b, which are symmetrically positioned on opposite sides of the vertical plane I—I (of Fig. 2); and which are adapted to be alternately moved, as a unit assemblage, from the full line position to the dotted line position of Fig. 5—to effect one severance—and from the dotted line position back to the full line position, to effect the next severance. Each of these discs (155a and 155b) is clamped against the upper face of a bevel pinion 157a, which is rotatably mounted on a fixed stud pin 205, that is secured to the end of a cylindrical sleeve 206 (see Fig. 7); and these sleeves are slidably supported on shaft members 158a and 158b, which are mounted in fixed end bearings 207—207 and 208—208, and are driven, in opposite directions, by a train of bevel and spur gears 159a—209—210 and 211—211 that are shown at the right of Fig. 5. The shafts, 158a and 158b, carry bevel pinions 157b, which are slidably, but non-rotatably, engaged therewith by spline and keyway connections, and are held in proper mesh relationship with the pinions 157a by the bracket extension 212—212 of the sleeve members 206—206. These members (206) are cross connected at their inner (right hand) ends by a crosshead 214, which is coupled by a link 215, to a twin arm actuating lever 216, that is pivoted on a fixed support 217, and is flexibly connected, at an intermediate point in its length, to a movable piston rod head 218, of a double acting cylinder-piston assembly 219—220. The fixed cylinder member 219 may be conveniently supported on one of the side ports (e. g. 16a), of the forehearth frame; and is provided with two fluid supply connections 221 and 222 that lead to a suitable timer valve member, which is actuated by a cam (not shown) on the shaft 78a, and which is adapted to alternately establish communication between a source of high pressure fluid and one of the cylinder connections, 221 or 222, and concurrently open the other connection (222 or 221) to the atmosphere.

The driving gears 209 and 210 are provided with suitable friction clutches (225 and 226) which may be concurrently actuated by means of a reciprocable frame 227, that is first moved in one direction, to engage the shaft with the gear 210 and disengage it from the gear 209, and then in the opposite direction, to effect the reverse connection. These alternately reversed movements are effected by a shift lever 228, which is fulcrumed, at 230, on a fixed support, and has its upper end slidably positioned on a piston rod extension 234. The shift lever 228 is alternately engaged and actuated by two adjustable collars 231 and 232 that are carried by the piston rod extension 234. The direction of rotation of the motor shaft 169 is preferably such that when the parts are in the full line position of Fig. 5 the disc 155a is being revolved in a clockwise direction, and the disc 155b in a counterclockwise direction.

The operation of this "double disc" shear will be readily understood from the preceding description. When the disc assembly is in the position last described, the severance of the stream of glass is effected by admitting compressed air (or other suitable fluid under pressure) to the left hand end of the cylinder 219 (through the connection 222) and the piston 220 is actuated to move the sliding frame 206—206—212—214 toward the end bearings 208; and the two oppositely revolving discs, 155a and 155b, are projected through the reduced neck portion of the accumulated mold charge 1, and carried on to the dotted line position to the right of the stream. The last half of this movement is progressively retarded (e. g. by a gradual cushioning of a portion of the trapped air at the exhaust end of the cylinder 219) so that the moving parts are brought to rest without shock or jar; and just before this movement is completed the collar 232 engages the shift lever 228 and reverses the clutch connections 226—225, etc., so that the discs 155a and 155b are then rotated in the opposite direction (as indicated by the dotted line arrows of Fig. 5). The next severance is effected by admitting fluid pressure to the right hand end of the cylinder 219 (through the pipe connection 221) and moving the parts back to the first described position; thereby bringing the collar 231 into engagement with the shift lever 228, and again reversing the direction of rotation of the cutting discs 155a and 155b.

In the use of this "double disc" shear the guard block 176 is dispensed with, but the lower guard tube 173a may be moved up until its upper end is in close juxtaposition to the plane of movement of the lower disc element 155b. The two cutting discs may be revolved in either direction with respect to the line of their joint transverse movement; but I prefer to operate them in the manner above described, so that the rotary motion of the edge of each disc is opposed to the linear motion of passage through the stream. Under these conditions of operation any lateral thrust of the two discs on the plastic material—as they move against it—is relieved by the reverse backward movement of the rotating edges with respect thereto—which tends to draw the glass toward the cutting edges instead of pushing it away from them.

I have referred, in the above description, to a "cutting" action of the revolving disc elements, but it will be understood that this action is quite different from that of an ordinary reciprocating shear blade, which severs the material by the relative approach movement of two sharpened edges that engage the soft material on opposite sides, and effect the severance of the stream, in part by a "pinching", and in part by a true shearing action. The rapidly revolving disc, or discs, act, on the contrary, like a "saw"; and the plain (unserrated) edges effect the desired severance of the glass in very much the same manner as similar smooth edged discs act to "cut" either hot or cold bars of metal; i. e., by the frictional generation of sufficient heat to actually melt away the metal in advance of the line of engagement. Such an operation exerts very little lateral pressure—and no pinching or squeezing action—on the material; and serves to heat, rather than to chill, the glass at the plane of severance, thus avoiding the "smear" and the "shear marks" which are frequently produced by the use of ordinary reciprocating shear blades.

Either the "single disc" or the "double disc" form of my improved severing mechanism is of particular advantage when the stream of glass is cut close to the lower end of the delivery orifice. This part of the stream is surrounded, for a considerable distance below its point of emergence, with a thin sheath or envelope S, of partially congealed and stiffened glass, which offers considerable resistance to the penetration of the ordinary cold shear blade, and correspondingly increases the difficulty of using such a form of severing element in this zone of action. But no such difficulty presents itself in the use of the high speed disc cutter; and the stiffened skin is, on the contrary, an advantage in such use, because it serves to resist and prevent any lateral displacement or distortion of the stream while the revolving disc is passing through it. I, therefore, preferably so adjust the vertical position of the severing mechanism, with respect to the bottom of the forehearth, that the plane of movement of the disc elements (155 or 155a and 155b) intersects, or lies within, this downwardly extending surface zone of stiffer and more viscous material. This adjustment of the "shear height" or plane of severance—which is effected by moving the cylinder assembly up or down on its forehearth frame supports (at 168, 174, etc.)—also enables me to utilize the "skin" effect, or surface tension effect of the cooler surface layer in temporarily, and controllably, restraining or arresting the stream movement of the glass, in the manner explained in my prior Patents Nos.

1,334,725 (line 68 et seq. pp. 2 and 3) and 1,375,336 (see lines 19 to 71 p. 3); and thereby assist the initial effect of the vacuum application in preventing any sensible downward flow of the molten material at the time of severance.

Thus it is apparent that during the operation of forming separate mold charges of molten glass I effect a severance of each successive charge by the localized application of mechanically generated heat to the issuing stream, and in this way, in effect, melt off the successive mold charges, or at least accomplish the severance under such conditions of localized heat application as to substantially, if not entirely, eliminate the possibility of scarring either the severed charge or the remaining stub. It will also be apparent that this may be accomplished without actually checking the stream flow by causing the severing disc or discs to move downwardly with the stream and at a rate sufficient to prevent a tendency of the glass to pile up on the disc or discs. In either case the discs are rotated at such a peripheral speed and are moved across the stream at such a rate as to substantially offset the tendency of the partially severed charge to pull away from the stub prior to complete severance and thus detrimentally affect the shape of the charge.

With the preceding disclosure as a guide those familiar with the construction and operation of glass feeders will be enabled to embody and utilize the characteristic features of my present improvements, in various other forms of apparatus that may differ in detail from the illustrative exemplifications which have been herein described; and it will, therefore, be understood that my invention, in its broader aspects, is not limited to the use of these specific exemplary embodiments; but that, within the scope of the accompanying claims, various changes may be made in the structural form, arrangement, and relationship of the operative parts without departing from the principles of the invention, and without sacrificing its chief advantages. I also desire it to be understood that I have devised various other shearing structures and procedures for severing a continuously flowing stream of molten glass to produce well formed mold charges and in which the shear blades are rotated and moved laterally into the path of the stream to effect the severance, and that such mechanisms and procedures form the subject matter of and are claimed in copending applications for patents and structurally and functionally distinguish from the features herein claimed.

What I claim is:

1. A method of forming separate charges of molten glass, which consists in establishing a stream-like flow of molten glass, momentarily checking such flow and severing a charge from such stream by a localized application of mechanically generated heat to such stream.

2. A method of forming separate charges of molten glass, which consists in establishing a stream-like flow of molten glass and periodically subjecting a suspended and otherwise unsupported portion of the mass constituting the stream to the localized application of mechanically generated heat.

3. A method of forming separate charges of molten glass, which consists in establishing a stream-like flow of molten glass through a submerged orifice, periodically checking such flow, and periodically severing a charge from a suspended portion of the mass constituting the stream by the localized application of mechanically generated heat thereto.

4. A method of forming separate mold charges of molten glass, which consists in establishing a stream-like flow of molten glass, severing a mold charge from a suspended portion of the mass constituting the stream by subjecting such portion to the heating action of a rapidly rotating disc contacting therewith.

5. A method of forming separate mold charges of molten glass, which consists in establishing a stream-like flow of molten glass through a submerged orifice, subjecting the portion of the mass constituting the stream and below such orifice to the heating action of mechanical friction applied at different points in substantially the same plane and at substantially right angles to the direction of flow and developing the heat at a rate sufficient to separate a mold charge from the stream.

6. A method of severing a mold charge from a depending mass of molten glass, which consists in subjecting a portion of such mass to a localized application of mechanically generated heat and progressively moving the point of localized application of such heat across such mass.

7. A severing mechanism for separating a stream of glass issuing through an orifice into mold charges, comprising a circular disc, means for rotating said disc at a high velocity, means for moving said rotating disc across the path of flow from said orifice to thereby develop heat by friction between the glass and the disc of such magnitude as to sever the mold charge by the heat developed, and means for adjusting the position of said disc toward and from said orifice.

8. In combination with a feeder for molten glass having a glass delivery orifice, a charge severing mechanism comprising a circular disc, means for rotating said disc at a high velocity, means for moving said disc laterally during its rotation, a guide for receiving the rotating edge of said disc and means for moving said disc and said guide toward and from the glass delivery orifice of said feeder.

9. A charge severing device comprising overlapping circular discs, means for rotating said discs at a high velocity, and means for moving said discs laterally while rotating at a high velocity.

10. A charge severing device comprising a pair of circular discs, means for rotating said discs in opposite directions, and means for moving said discs laterally during their rotation.

11. In combination with a glass feeder having a flow orifice, a charge severing mechanism, comprising a pair of circular discs, means for rotating said discs in opposite directions and at a high velocity, and means for moving said discs across the flow orifice of said feeder first in one and then in the opposite direction, while maintaining their rotation.

12. A method of severing mold charges from a stream of molten glass which consists in periodically moving an implement traveling at a high heat generating speed into and out of contact with said stream to effect a severance thereof.

13. A method of severing mold charges from a stream of molten glass which consists in periodically checking said stream and then moving an implement traveling at a heat generating speed into contact with such stream to effect a severance thereof.

14. A method of forming mold charges of molten glass which consists in establishing a stream-like flow of molten glass through a submerged orifice, periodically retarding the flow of said stream, and during the period of retarded flow moving an implement toward said stream at a speed sufficient to generate heat to melt away the glass in advance of such implement.

15. A method of forming mold charges of molten glass which consists in establishing a stream-like flow of molten glass through a submerged orifice, periodically moving an implement traveling at a heat generating speed toward said stream to effect a severance thereof, and utilizing the surface tension of the stream to temporarily restrain the movement of the glass through the orifice.

16. A method of forming individual mold charges from a stream of glass issuing through an orifice which consists in periodically moving an element rotating at a peripheral speed of at least 3000 feet per minute into heat generating contact with said stream to sever the same, and utilizing the surface tension of the stream to temporarily restrain movement of the glass through said orifice while withdrawing said element.

17. A device for severing a suspended stream of molten glass comprising a circular rotatably mounted disc, a guard movable to a stream encompassing position, means for continuously rotating said disc, means for moving said guard laterally to its stream embracing position, and means for moving said disc laterally across the path of said stream during the continued rotation thereof, said guard being slotted to receive said disc and partially prevent the radial projection of glass particles therefrom.

18. A device for severing a suspended stream of molten glass comprising a circular rotatably mounted disc, a guard movable to a stream encompassing position, means for moving said guard laterally to such stream embracing position, means for moving said disc across the path of said stream during the continued rotation thereof, and means associated with said guard for directing a heated fluid against said stream.

19. A device for severing a suspended stream of molten glass comprising a circular rotatably mounted disc, means for continuously rotating said disc, means for moving said rotating disc through said stream to effect a severance thereof, and means for encompassing and directing a heated fluid against said stream during the movement of said disc therethrough.

20. A device for severing a suspended stream of molten glass comprising a circular rotatably mounted disc, means for continuously rotating said disc at a peripheral speed of about 3000 feet per minute, means for moving said disc across the path of said stream to effect a severance thereof, a movable guard, and means for moving said guard to a stream encompassing position in timed relation with the movement of said disc into said stream.

21. A device for severing a suspended stream of molten glass comprising a circular rotatably mounted disc, a horizontally slotted guard movable from a position remote from said stream to a stream encompassing position, means for continuously rotating said disc, means for moving said disc laterally through said stream to effect a severance thereof, and means for moving said guard to its stream encompassing position in timed relation with the lateral movement of said disc.

22. A method of forming separate mold charges from a suspended stream of molten glass which consists in continuously rotating a cutting element at a heat generating speed and periodically moving said rotating implement laterally into contact with said stream at a lateral speed sufficient to offset the tendency of the partially severed charge to pull away from said stream prior to the complete severance thereof.

FRANK L. O. WADSWORTH.